United States Patent

Di Martini et al.

[11] 3,923,501
[45] Dec. 2, 1975

[54] FILLER SOLDER

[75] Inventors: Carl R. Di Martini, Piscataway; Michael Myers, New Brunswick, both of N.J.

[73] Assignee: Asarco Incorporated, New York, N.Y.

[22] Filed: Jan. 9, 1974

[21] Appl. No.: 432,107

[52] U.S. Cl. .............................. 75/166 C; 75/166 B
[51] Int. Cl.² ................... C22C 11/08; C22C 11/10
[58] Field of Search ........................ 75/166 C, 166 B

[56] References Cited
UNITED STATES PATENTS

| | | | |
|---|---|---|---|
| 1,807,788 | 6/1931 | Kemp | 75/166 C |
| 2,298,237 | 10/1942 | Smith et al. | 75/166 C |
| 2,351,477 | 6/1944 | Bouton et al. | 75/166 C |
| 2,370,439 | 2/1945 | Beard | 75/166 C |
| 2,678,341 | 5/1954 | Stoertz | 136/65 |
| 3,197,862 | 8/1965 | Harvey | 29/528 |

*Primary Examiner*—L. Dewayne Rutledge
*Assistant Examiner*—E. L. Weise
*Attorney, Agent, or Firm*—R. J. Drew; E. J. Schaffer

[57] ABSTRACT

Filler solder for use on automobile bodies and the like and containing essentially the following constituents within the proportion ranges hereafter set forth:

| | % by Weight |
|---|---|
| Antimony | 1.5 to 5.3 |
| Arsenic | 0.7 to 2.5 |
| Tin | maximum 0.20 |
| Lead | substantially the remainder |

The arsenic plus antimony in the solder should total at least 3.5% but not exceed 6%. The solder is free of hard tin-arsenic platelets and free of an undesirable grittiness, which is attributed to the elimination of the tin-arsenic platelets. Due to its freedom from grittiness, the filler solder is readily applied to automobile bodies and the like for filling certain crevices and spaces in the sheet metal bodies as a smoothsurfaced deposit.

6 Claims, 5 Drawing Figures

FILLER SOLDER

BACKGROUND OF THE INVENTION

1. Field of the Invention

This invention relates to filler solder and more especially to new and improved filler solder especially adapted for use as a filler material for automobile bodies and the like, such filler solder being readily applicable to the sheet steel of automobile bodies and the like as a substantially smooth-surfaced deposit and without the formation of pits and pops in the subsequent painting and baking operations.

2. Description of the Prior Art

Lead base filler solder alloy has been applied to automobile bodies by partially melting the solder, stirring the partially melted solder slightly, and then applying the solder to the heated and tinned automobile body as a viscous "mush". The solidus temperature, liquidus temperature, and volume fraction of liquid, as a function of temperature, are significant factors in determining ease of application of the solder. For example, a solder alloy with a very narrow freezing range would be difficult to control to a desirable volume fraction of liquid to provide the desired fluidity of plasticity for easy application. A lead base filler solder presently being employed on automobile bodies has the nominal composition of Pb-5% Sb-1% Sn-0.5% As, and is about 25% eutectic by volume with a 38°C. freezing range. Such a filler solder is disclosed in U.S. Pat. No. 3,197,862 which discloses body filler solders containing about 4.5% to 6% antimony, 0.3% to 0.6% arsenic, 0.25% to 3.5% tin, balance substantially all lead.

The aforementioned prior art Pb-Sb-As-Sn filler solder alloy has been the subject of customer complaints over the years in that the solder mush or plastic mass was gritty at the application temperature and difficult to apply. The undesirable grittiness of the filler solder was of such nature that one could actually feel the hard grit particles in the soft, semi-solid mass of filler solder. The workers applying the filler solder to the automobile bodies complained about the grittiness of the solder, and that the gritty solder was not easily applicable to the automobile bodies as a smooth-surfaced deposit. Another customer complaint regarding the gritty filler solder has been that the gritty solder alloy solidified in such manner on the automobile body as to result in the formation of pits and pops in the solder in subsequent painting and baking operations. One plausible explanation advanced for the formation of the pits and pops has been the dislodging of the grit particles from the solder surface after application of the solder, leaving pits or indentations. Air is entrapped or occluded in the pits by the paint film during the painting, and the expansion of the heated occluded air during the baking results in the formation of the pops.

U.S. Pat. No. 2,370,439 discloses a lead filler alloy for use on automotive vehicles and comprising between about 2 and 7% antimony, between about 0.04 and about 0.1% arsenic, between about 0.02% and about 0.07% copper, between about 1% and about 4% tin, balance substantially all lead. U.S. Pat. No. 3,644,115 relates to solder filler metal alloys comprising about 0.005 to 0.2% aluminum, about 0.2 to 99% tin, remainder lead. U.S. Pat. No. 1,807,788 discloses lead base alloys of greater than normal hardness comprising about 1% to about 10% antimony, about 0.2% to about 2% arsenic, and about 0.1% to about 2% tin, the tin content being about one-fifth of the antimony content. U.S. Pat. No. 2,351,477 discloses a wiping solder alloy containing 61-67% lead, 20-26% bismuth, 10-16% tin, 0.05-0.15% arsenic and 0.1-1% antimony, together with incidental impurities. U.S. Pat. No. 2,439,068 discloses solder compositions consisting of about 20% tin, from above 0.005% to about 0.5% zinc, from about 0.5% to about 1.75% antimony, balance substantially all lead. U.S. Pat. No. 2,191,624 relates to wiping solders containing between about 30% and about 40% tin, between about 0.02% and about 0.15% arsenic, remainder lead together with incidental impurities. U.S. Pat. No. 2,290,237 is concerned with lead base coating alloy consisting of 0.2%-3% antimony, 0.2%-5% zinc, 1%-10% tin, balance lead, with the zinc and lead totalling not less than 3%.

OBJECTS OF THE INVENTION

One object of the invention is to provide a new and improved filler solder for use on automobile bodies and the like which is free of grittiness, and hence is readily applicable to the sheet metal automobile bodies and the like as a smooth surfaced deposit.

Another object of the invention is to provide a new and improved filler solder for use on sheet steel automobile bodies and the like, which is free of grittiness due to its being free of an undesirable tin-arsenic phase and, more specifically, free of undesirable hard tin-arsenic platelets.

Another object is to provide a new and improved filler solder for use on automobile bodies which eliminates or substantially eliminates the undesirable pit and pop formation after painting and baking.

An additional object is to provide a filler solder characterized by possessing a ratio of volume fraction of solid (dendritic lead) to volume fraction of liquid at application temperatures such as to possess the desired plasticity or fluidity of the filler solder for easy, trouble-free application to automobile bodies and the like.

A further object is to provide a filler solder characterized by having a wide freezing range which facilitates obtention of the desired ratio of volume fraction of dendritic lead (solid) to volume fraction of liquid at the application temperature, such that the filler solder possesses the desired plasticity at the application temperature for easy, trouble-free application to automobile bodies and the like.

Additional objects and advantages will be readily apparent as the invention is hereinafter described.

SUMMARY OF THE INVENTION

We have found that the aforementioned grittiness and difficult application problems are minimized or eliminated and all of the aforementioned objects attained by a filler solder alloy containing essentially the following constituents and in proportions within the following critical proportion ranges:

|  | % by Weight |
|---|---|
| Antimony | 1.5 to 5.3 |
| Arsenic | 0.7 to 2.5 |
| Tin | maximum 0.20 |
| Lead | substantially the balance or remainder |

The total of arsenic plus lead in the filler solder is critically at least 3.5% and not in excess of 6%. The microstructure of the alloy is free or substantially free of a tin-arsenic phase and free or substantially free of hard tin-arsenic platelets, and we attribute the improvements provided by the filler solder of this invention in being free or substantially free of grittiness and hence readily applicable to sheet metal automobile bodies and the like as a smooth surfaced deposit to the absence of the tin-arsenic phase, and more specifically to the absence of the hard tin-arsenic platelets.

The freedom or substantial freedom from grittiness and the ease of application to automobile bodies and the like as a smooth surfaced deposit provided by the body filler solder of this invention, as well as the elimination or substantial elimination of the pits and also the pops after painting and baking provided by the filler solder herein were unexpected results.

The 0.20% maximum of tin is critical in the new and improved filler solder of this invention for the reasons that with amounts of tin in excess of 0.20% the undesirable tin-arsenic phase and the grittiness occurs in the solder. The 0.7% to 2.5% range of arsenic is also critical in the filler solders of this invention for the reasons that with an amount of arsenic in the solder much in excess of 2.5%, there is too great a volume fraction of liquid at the application temperature, i.e. there is too much liquid in the filler solder at the application temperature relative to the solid therein. Due to the too great volume fraction of liquid, the filler solder is too liquid and does not have a suitable or proper plasticity for application to automobile bodies. With an amount of arsenic in the filler solder substantially below 0.7%, there is in general either too great or too little volume fraction of liquid phase at the application temperature, i.e. too much or too little liquid phase is present in the solder at the application temperature relative to the solid therein, or an undesirably high liquidus temperature. By reason of the excessive or insufficient liquid phase being present, the filler solder is either too liquid or too solid respectively and is not suitable for application to automobile bodies due to not having a proper plasticity for such application. The 1.5%–5.3% of antimony is critical in the filler solders of this invention for the reason an amount of antimony much above 5.3% cuts down the freezing range of the solder excessively and results in too narrow a freezing range. With the narrow freezing range, it is more difficult to obtain the proper ratio of volume fraction of dendritic lead (solid) to volume fraction of liquid such as to attain a suitable or proper plasticity in the filler solder, at the application temperature, for application to automobile bodies. Furthermore, an amount of antimony much above 5.3% in the solder results in an excessive volume fraction of liquid in the solder at the application temperature, i.e. the solder is too liquid at the application temperature to have the proper plasticity for application to automobile bodies. A quantity of antimony much below 1.5% in the filler solder herein results in an insufficient volume fraction of liquid phase therein, and the filler solder is too solid and does not have the desired fluidity or plasticity for ease of application.

It is critical that the total of arsenic plus antimony in the solder alloys herein be at least 3.5% by weight but not more than 6% by weight for the following reasons: Alloys of this invention containing in excess of a total of 6% of arsenic and antimony contain too much volume fraction of low-melting secondary phase(s) containing lead, arsenic and antimony. Consequently, excessive volume fraction of liquid phase is present in the filler solder at the application temperature in the range of about 245°C. to about 285°C., and the filler solder is too fluid or liquid and does not have the desired plasticity for application to the automobile body. Alloys of this invention which contain less than a total of 3.5% of arsenic and antimony contain insufficient low melting phase(s) containing lead, arsenic and antimony, and too much relatively high melting phase (dendritic lead). As a result, there is too little volume fraction of liquid phase and too much volume fraction of solid phase (dendritic lead) present at the application temperature in the range of about 245°C. to 285°C., and the filler solder does not have sufficient fluidity or liquidity to possess the desired plasticity for application to automobile bodies. Furthermore, the presence of a total of arsenic plus antimony of less than 3.5% in the alloys of this invention results in liquidus temperatures considerably higher than 285°C. and in excess of 300°C., which are higher liquidus temperatures than desirable.

The filler solders herein are characterized by a wide freezing range corresponding to a liquidus of about 285°C. and a solidus of about 245°C.

The filler solders of this invention are characterized by containing about 70 to about 80% by volume dendritic lead, which is the solid phase, and about 30 to about 20% by volume liquid phase. By virtue of containing such amounts of solid phase and liquid phase, the filler solders herein possess a desired plasticity at the application temperature for easy, trouble-free application to automobile bodies and the like. This corresponds to a ratio of volume fraction of solid phase (dendritic lead) to volume fraction of liquid phase in the filler solder of about 2.33:1 to about 4:1 respectively.

A grain refining agent may, if desired, be added to the solder alloy of this invention. The grain refining agent or grain refiner, as the agent is commonly referred to in the alloy art, is added to the solder alloy in small amount which is sufficient to result in a finer grain size in the alloy. Any suitable grain refining agent can be utilizable. Sulfur is exemplary of the grain refining agent and, when utilized, is added to the solder alloy herein in typical amounts of about 0.003% to about 0.004% by weight of the sulfur, based on total alloy composition. The grain refiner is added to the solder alloy herein usually by being added to the molten alloy prior to supplying the molten alloy into a mold or molds.

The filler solder of this invention is produced by a method involving preparing a molten alloy containing essentially, by weight, 1.5% to 5.3% antimony, 0.7% to 2.5% arsenic, maximum 0.20% tin, the balance substantially all lead, and feeding or supplying the molten alloy into a mold or molds. The constituents can be melted together in a suitable vessel until the molten alloy is obtained or, if desired, the lead melted first and the remaining constituents, either as liquid melt or in solid form, added to or blended with the molten lead. If the remaining constituents are added in solid form to the molten lead, they are melted while together with the molten lead by heat supplied by conventional and well known heating means. The molten alloy is then fed or supplied into a mold or molds, ordinarily a metal mold or molds, and the alloy cooled to below its solidus temperature. The resulting solidified filler solder casting is removed from the mold, and the microstructure of the solder alloy casting is free or substantially free of the undesirable tin-arsenic phase and of the hard tin-arsenic platelets.

The cooling of the filler solder alloy in the mold or molds is rapid and at a rate in excess of 20°F. per second above the liquidus temperature of the alloy and at a rate in excess of 6°F. per second in the temperature range between the liquidus and solidus temperature of the alloy.

The molten alloy can be cast by any suitable casting procedure including continuous and non-continuous or static casting. For example, the molten alloy can be cast continuously in a wheel mold, such as a vertical wheel mold or a horizontal wheel mold, such as is disclosed in U.S. Pat. No. 3,197,862 wherein an annular copper mold is formed as an annular groove in the upper surface of a rotable wheel. In the last-mentioned horizontal mold, a cooling water jacket is provided within the wheel portion for cooling the solder alloy at the rapid rate hereinbefore disclosed. In casting in a vertical wheel mold, the molten solder alloy is gravity fed from a vessel to a groove in the metal rim of the wheel, and the solder rapidly cools and rapidly solidifies in the groove. The solidified solder continuous strip is worked to reduce one of its transverse dimensions 25% or more after leaving the horizontal wheel mold, or after leaving the vertical wheel mold. If a grain refiner has been added to the solder melt this continuous strip will ordinarily not be worked after leaving the wheel mold but can be worked, if desired. The working can be effected by cold working such as by compressing in a press, such as a vertical reciprocating press, or by rolling between the rolls of a conventional rolling apparatus, whereby the thickness of the solder strip is reduced 25% or more and usually in the range of 25% to 75%. The solder strip is then cut into the desired length by a conventional cutting blade. Alternatively, the liquid molten alloy can be cast by static casting in the form of billets or pigs in a suitable metal mold, for instance a water-cooled copper mold. The billets or pigs are extruded into filler solder bars or strips of the desired cross-sectional dimensions and usually to reduce their cross-sectional areas 75% or more, in a conventional press-extrusion apparatus. The solder strip is cut into predetermined lengths by means of a conventional cutting blades.

The filler solder alloy bars or lengths have a typical cross section of ½ × ¼ inch.

A plurality of alloys were prepared of the compositions set forth in the table hereinafter set forth. The alloys were cast and microstructural analysis conducted on the alloys. The microstructural analysis included light and Scanning Electron Microscopic observation, as well as X-ray analysis. Light optics were used to determine the form and, with certain alloy, relative amount of the primary phase. Scanning Electron Microscope and microprobe work was employed to determine the components and morphology of the phases. X-ray procedures were employed to determine the exact nature of the tin-arsenic phase found in the tin-bearing alloys. The liquidus and solidus points were also determined for each alloy. The results are set forth in the table which follows:

| Alloy No. | Pb | % Sb | % As | % Sn | $T_L$°C | $T_S$°C | ΔT°C | Primary Phase (Percentages by Volume) | Volume Ratio of Higher Melting Dendritic Lead to Lower Melting Secondary Phases |
|---|---|---|---|---|---|---|---|---|---|
| 1 | Balance | 5.0 | 0.5 | 1.5 | 280 | 242 | 38 | Pb dendrites, 75% + $Sn_4As_3$ | — |
| 2 | " | 4.0 | 1.5 | 1.5 | 320 | 242 | 78 | $Sn_4As_3$ | — |
| 3 | " | 3.0 | 2.5 | 1.5 | 320 | 242 | 78 | $Sn_4As_3$ | — |
| 4 | " | 0.90 | 1.05 | 0 | 302 | 245 | 57 | Pb dendrites, 92% | 11.47:1 |
| 5 | " | 8.90 | 1.08 | 0 | 253 | 245 | 8 | No Pb dendrites observed | — |
| 6 | " | 8.0 | 1.50 | 0 | 255 | 245 | 10 | No Pb dendrites observed | — |
| 7 | " | 1.98 | 1.90 | 0 | 285 | 245 | 40 | Pb dendrites, 74% | 2.84:1 |
| 8 | " | 6.9 | 2.07 | 0 | 255 | 245 | 10 | No Pb dendrites observed | — |
| 9 | " | 5.24 | 2.30 | — | 264 | 245 | 19 | No Pb dendrites observed | — |
| 10 | " | 1.0 | 2.9 | 0 | 285 | 245 | 40 | Pb dendrites, 30% | 0.42:1 |
| 11 | " | 1.5 | 2.9 | 0 | 282 | 245 | 37 | No Pb dendrites observed | — |
| 12 | " | 2.1 | 2.9 | 0 | 278 | 245 | 33 | Pb dendrites, 13% | 0.14:1 |
| 13 | " | 5.34 | 4.50 | — | 278 | 245 | 33 | As-Sb crystals, No Pb dendrites observed | — |
| 14 | " | 2.13 | 4.90 | — | 291 | 245 | 46 | As-Sb crystals, No Pb dendrites observed | — |
| 15 | " | 2.0 | 2.0 | 0.01 | 282 | 245 | 37 | Pb dendrites, 74% | 2.84:1 |
| 16 | " | 2.0 | 2.0 | 0.05 | 282 | 245 | 37 | Pb dendrites, 74% | 2.84:1 |
| 17 | " | 2.0 | 2.0 | 0.25 | 282 | 245 | 37 | Pb dendrites, 74% + $Sn_4As_3$ | — |
| 18 | " | 2.0 | 2.0 | 1.0 | 322 | 245 | 77 | $Sn_4As_3$ | — |

$T_L$ = Liquidus Temperature
$T_S$ = Solidus Temperature
ΔT = $T_L$-$T_S$

The data of the foregoing table shows that with tin contents of 0.25% and 1.0% in Alloy No.'s 17 and 18 respectively and tin content of 1.5% in each of Alloy No.'s 1, 2 and 3, the tin-arsenic phase, believed to be $Sn_4As_3$, which was the undesirable phase, was present. However in Alloy No.'s 15 and 16 of the table, which are filler solder alloys of the present invention and wherein the tin was present therein in amounts of only 0.01% and 0.05% respectively, no tin-arsenic phase was present in the alloy. In Alloy No.'s 5, 6, 8, 9, 13 and 14 wherein the total of arsenic plus antimony was in excess of 6% in each alloy, no dendritic lead, which is the relatively high melting phase, was present and the solder is too liquid and does not have the desired plasticity for application to automobile bodies. In Alloy No. 4 wherein the total of arsenic plus antimony was less than 3.5%, too much relatively high melting phase, i.e. 92% lead dendrites, is present in the alloy and insufficient low melting phase is present therein, and consequently there is too much volume fraction of solid phase and too little volume fraction of liquid phase present in the alloy at the application temperature in the range of about 245°C. to about 285°C., and the solder is too solid and does not have the desired plasticity for application to automobile bodies at the aforementioned application temperatures. Further the liquidus temperature of Alloy No. 4 of 302°C. is undesirably high. In Alloy No.'s 7, 15 and 16, which are alloys of this invention and wherein the total arsenic plus antimony is in the range of 3.5% to 6%, the alloys possess a proper ratio of volume fraction of solid phase (dendritic lead) to volume fraction of liquid phase at the application temperature in the range of about 245°C. to 285°C. to have the desired plasticity for easy, trouble-free application to automobile bodies.

DETAILED DESCRIPTION

Figure 1:
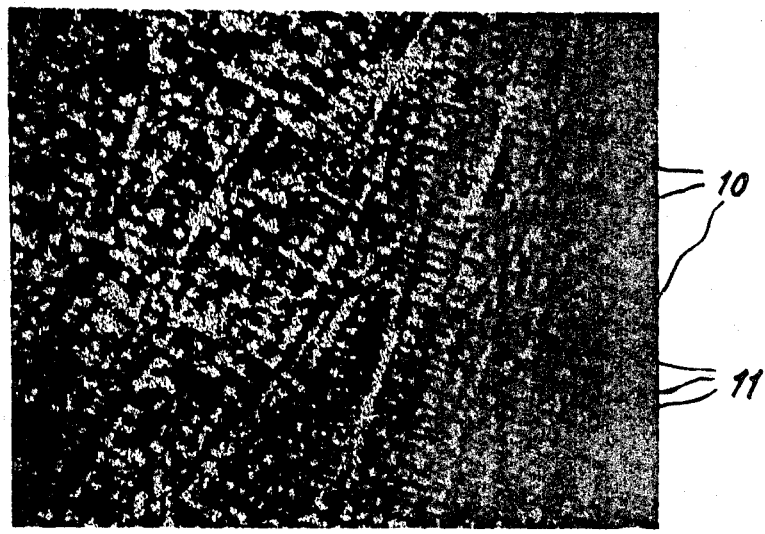
FIG. 1 is a photomicrograph of a filler solder alloy of this invention which is free of tin as a constituent, the photomicrograph being at 200X magnification.
Figure 2:
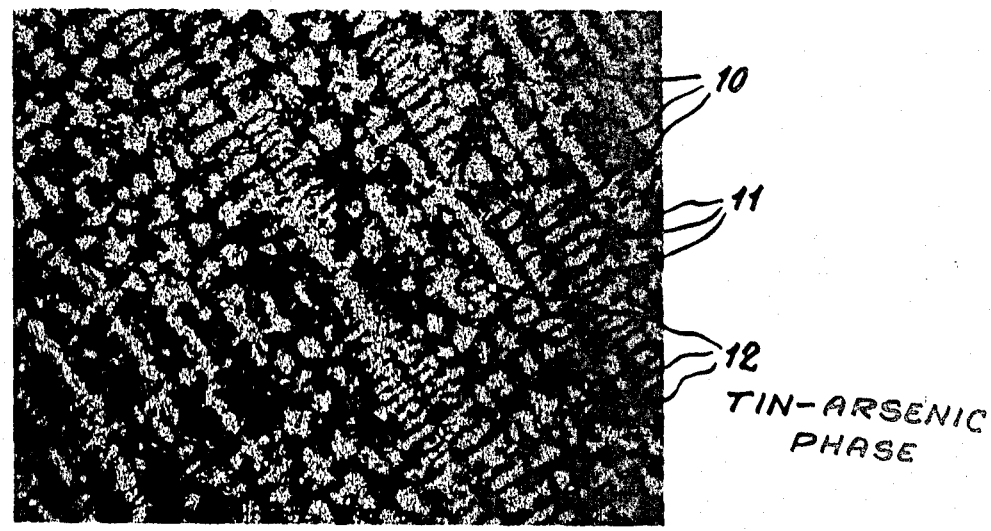
FIG. 2 is a photomicrograph of a filler solder alloy not of this invention and containing, by weight, 0.25% tin, the photomicrograph being at 200X magnification.
Figure 3:
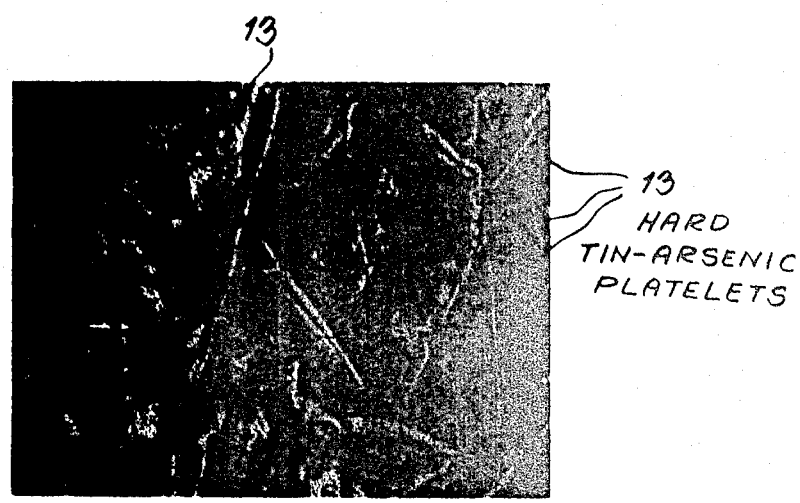
FIG. 3 is an electron image of a conventional filler solder alloy not of this invention and containing, by weight, 1% tin, the electron image being at 400X magnification and obtained with a Scanning Electron Microscope.
Figure 4:
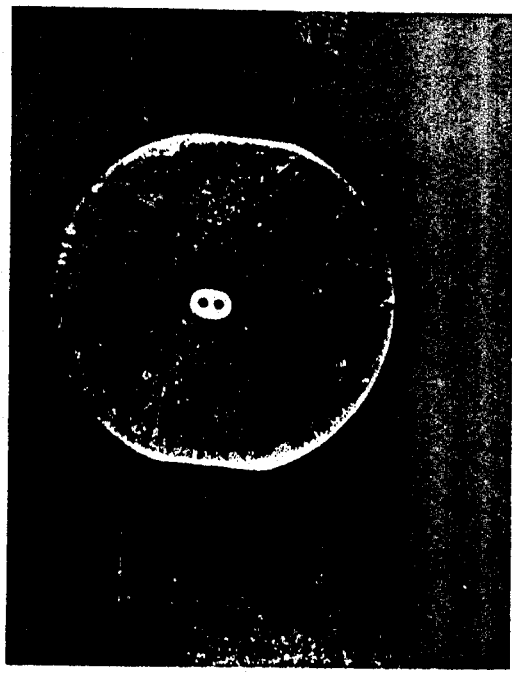
FIG. 4 is a photomicrograph showing the large, hard tin-arsenic platelets which had been filtered out of a solder alloy not of this invention and containing 2% by weight tin, the photomicrograph being at 1X magnification.
Figure 5:
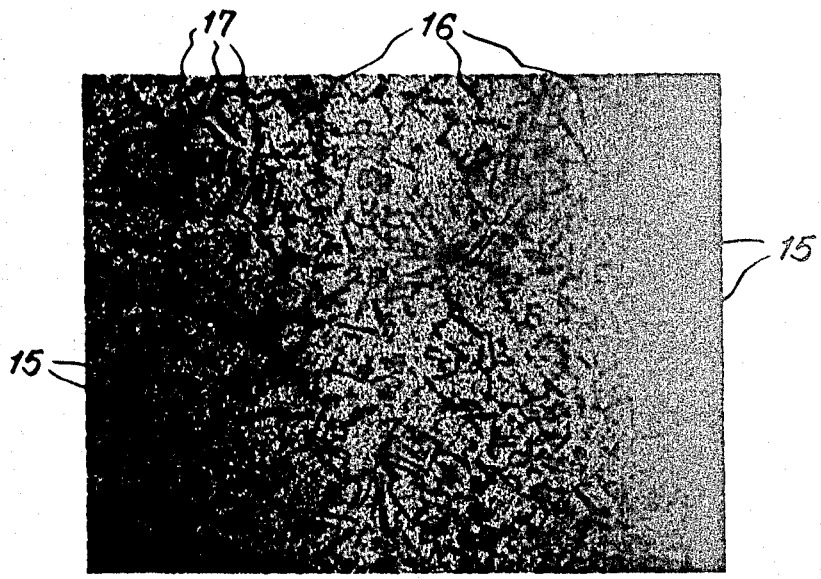
FIG. 5 is a photomicrograph of a solder alloy not of this invention and containing 4.90% by weight arsenic, the photomicrograph being at 100X magnification.

Referring to FIG. 1 which shows the microstructure of a filler solder alloy of the present invention which is free of Sn as a constituent and contains, by weight 2% As, 2% Sb, balance Pb, the light-colored lead dendrites are shown at 10 and the dark-colored low melting phases containing lead, arsenic and antimony at 11. With reference to FIG. 2 showing the microstructure of a prior art filler solder alloy and containing, by weight, 2% As, 2% Sb, 0.25% Sn, balance Pb, the undesirable "islands-like" tin-arsenic phase are shown at 12, the light-colored lead dendrites at 10, and the dark-colored low melting phases at 11. Referring to FIG. 3 showing an electron image of the prior art filler solder alloy containing, by weight, 0.5% As, 5% Sb, 1.5% Sn, balance Pb, a continuous network of the undesirable tin-arsenic phase in the form of hard platelets of the tin-arsenic phase, believed to be Sn₄As₃, is shown at 13. We found the hard platelets of the tin-arsenic phase when present in an extruded form or shape of a rapidly cooled filler solder not of this invention and containing in excess of 0.20% by weight tin, and also antimony, arsenic, balance substantially all lead, to have a mean largest dimension in excess of 0.001 inch, and a hardness in excess of a 450 Vickers Hardness Number (100 gram load), as determined by A.S.T.M. designation E-92 which is The Standard Method of Test for Vickers Hardness of Metallic Materials. In obtaining the photomicrograph of FIG. 4, a solder alloy containing, by weight, 2% tin, 4% arsenic, 2% antimony, balance lead was melted and then filtered to filter out the large hard tin-arsenic platelets. The separated tin-arsenic platelets, which retained some lead between the platelets, were subsequently remelted and cast in a mold. The hard tin-arsenic platelets are shown at 14. With reference to FIG. 5 showing an alloy containing, by weight, 4.90% arsenic, 2.13% antimony, balance lead, antimony-arsenic crystals are shown at 15, secondary lead at 16 and other antimony-arsenic phases at 17. Antimony-arsenic crystals 15 are undesirable, large, hard crystals having typical largest dimension in excess of 0.001 inch. The presence of the large, hard antimony-arsenic crystals was attributed to the relatively large amount of arsenic, which was considerably in excess of the 2.5% upper limit of arsenic. The presence of these large, hard antimony-arsenic crystals is undesirable as they are believed to contribute to the grittiness problem which is overcome by the filler solder of the present invention. The alloys of FIGS. 1-5 were etched in a mixture of acetic acid and hydrogen peroxide prior to taking the photomicrograph or electron image.

Incidental impurities may be present in the solder alloys here. The incidental impurities are exemplified by one or more of copper, bismuth, silver, tellurium, selenium and sulfur.

DESCRIPTION OF THE PREFERRED EMBODIMENTS

The filler solder preferably has the following composition:

| | % by Weight |
|---|---|
| Antimony | 1.5 to 5.3 |
| Arsenic | 0.7 to 2.5 |
| Lead | the remainder, except for incidental impurities |

The total of arsenic plus antimony in the solder is at least 3.5% but not more than 6%. The microstructure of the solder is free of a tin-arsenic phase and free of hard tin-arsenic platelets.

What is claimed is:

1. A filler solder containing essentially the following constituents in proportions within the proportion ranges hereafter set forth:

| | % by Weight |
|---|---|
| Antimony | 1.5 to 5.3 |
| Arsenic | 0.7 to 2.5 |
| Tin | 0 to 0.20 |
| Lead | substantially the remainder | the total arsenic plus antimony being at least 3.5% but not more than 6%, the solder being substantially free of hard tin-arsenic platelets and free of an undesirable grittiness due to elimination of the hard tin-arsenic platelets, the solder having a freezing range corresponding to a liquidus of about 285°C. and a solidus of about 245°C., and a plasticity at an application temperature within the about 245°C. to about 285°C. freezing range such as to enable the solder plastic mass to be readily applied to an automobile body.

2. The solder of claim 1 containing, at the application temperature within the about 245°C. to about 285°C. range, about 70% to about 80% by volume of dendritic lead and about 30% to about 20% by volume of liquid phase.

3. The solder of claim 2 wherein the solder is free of tin as a constituent.

4. The solder of claim 2 also containing a grain refining agent.

5. The solder of claim 4 wherein the grain refining agent is sulfur.

6. The filler solder of claim 2 in the form of a bar.

* * * * *

UNITED STATES PATENT OFFICE
CERTIFICATE OF CORRECTION

Patent No. 3,923,501   Dated December 2, 1975

Inventor(s) Carl R. DiMartini and Michael Myers

It is certified that error appears in the above-identified patent and that said Letters Patent are hereby corrected as shown below:

Page 1, in the abstract, penultimate line thereof, "smoothsurfaced" should read -- smooth-surfaced --. Column 1, line 26, "of" should read -- or --. Column 2, lines 55 and 56, "elminated" should read -- eliminated --. Column 6, line 3, delete "a". Column 8, line 18, "here" should read -- herein --.

Signed and Sealed this first Day of June 1976

[SEAL]

Attest:

RUTH C. MASON
Attesting Officer

C. MARSHALL DANN
Commissioner of Patents and Trademarks